US010998796B2

(12) United States Patent
Ikemoto et al.

(10) Patent No.: US 10,998,796 B2
(45) Date of Patent: May 4, 2021

(54) STRUCTURE FOR COOLING ROTATING ELECTRICAL MACHINE AND VEHICLE DRIVE DEVICE

(71) Applicants: AISIN AW CO., LTD., Anjo (JP); TOYOTA JIDOSHA KABUSHIKI KAISHA, Toyota (JP)

(72) Inventors: Masayuki Ikemoto, Anjo (JP); Takuya Komatsu, Anjo (JP); Takefumi Komaki, Okazaki (JP); Hiroshi Kato, Nukata-gun (JP); Satoshi Miyanaga, Okazaki (JP); Yoshinari Nakagawa, Nishio (JP); Tomohito Ono, Susono (JP); Hiroto Hashimoto, Ebina (JP); Takashi Matsumoto, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/514,367

(22) Filed: Jul. 17, 2019

(65) Prior Publication Data
US 2020/0028412 A1 Jan. 23, 2020

(30) Foreign Application Priority Data

Jul. 18, 2018 (JP) .............................. JP2018-135128
May 27, 2019 (JP) .............................. JP2019-098474

(51) Int. Cl.
*H02K 9/19* (2006.01)
*H02K 9/193* (2006.01)
*H02K 9/16* (2006.01)

(52) U.S. Cl.
CPC ................. *H02K 9/19* (2013.01); *H02K 9/16* (2013.01); *H02K 9/193* (2013.01)

(58) Field of Classification Search
USPC ...................................................... 310/52–65
See application file for complete search history.

(56) References Cited

U.S. PATENT DOCUMENTS 7,462,963 B2 * 12/2008 Ishihara .................. B60L 3/003
                                                                310/58
7,834,492 B2 * 11/2010 Iund ........................ B60L 50/61
                                                                310/52

(Continued)

FOREIGN PATENT DOCUMENTS

JP          2015-089314 A          5/2015

*Primary Examiner* — Quyen P Leung
*Assistant Examiner* — Minki Chang
(74) *Attorney, Agent, or Firm* — Oliff PLC (57) ABSTRACT

A structure for cooling a rotating electrical machine includes: an oil pump, a supply oil passage connected to a discharge port of the oil pump, and a first oil passage that is an oil passage located above a stator of the rotating electrical machine in a vertical direction and that has a supplied portion, a discharge hole, and a discharge portion. The supplied portion is connected to the supply oil passage. The discharge hole is formed on a first side in an axial direction, which is one side in the axial direction of the rotating electrical machine with respect to the supplied portion and is configured to discharge oil toward the stator. The discharge portion is formed on the first side with respect to the discharge hole. A second oil passage is formed inside a rotor shaft to which a rotor of the rotating electrical machine is fixed, and a third oil passage connects the discharge portion of the first oil passage and the second oil passage. The third oil passage is formed along a first wall of the case which is located on the first side with respect to the rotating electrical machine.

18 Claims, 5 Drawing Sheets

(56) References Cited

U.S. PATENT DOCUMENTS

2016/0276901 A1    9/2016   Nagaishi et al.
2017/0170707 A1*   6/2017   Takagi .................. H02K 7/006

* cited by examiner

STRUCTURE FOR COOLING ROTATING ELECTRICAL MACHINE AND VEHICLE DRIVE DEVICE

INCORPORATION BY REFERENCE

The disclosure of Japanese Patent Applications No. 2018-135128, filed on Jul. 18, 2018, and No. 2019-098474, filed on May 27, 2019, including the specification, drawings and abstract is incorporated herein by reference in its entirety.

BACKGROUND

1. Related Technical Fields

Related technical fields include structures for cooling a rotating electrical machine accommodated in a case and vehicle drive devices having such a structure for cooling a rotating electrical machine.

2. Description of the Related Art

Japanese Patent Application Publication No. 2015-89314 (JP 2015-89314 A) discloses an example of such a structure for cooling a rotating electrical machine. In the following description of the related art, reference characters in parentheses are those in JP 2015-89314 A. JP 2015-89314 A describes a structure for cooling a motor (2) accommodated in a case (3). In this structure, a cooling pipe (10) having a plurality of small holes (12) is placed adjacent to a stator (22) within the case (3), and oil pumped from a pump (31) is discharged toward the stator (22) through the small holes (12) to cool the stator (22).

When cooling a rotating electrical machine, it is sometimes desirable to be able to appropriately cool not only a stator but also a rotor. For example, in the case where a rotating electrical machine to be cooled is a permanent magnet rotating electrical machine having a rotor with permanent magnets embedded in a rotor core, irreversible demagnetization may occur if the temperature of the permanent magnets becomes too high. It is therefore desirable to be able to appropriately cool the rotor. The use of highly coercive permanent magnets can avoid such irreversible demagnetization. However, this causes an increase in cost as a rare metal(s) needs to be added to permanent magnets in an amount large enough to provide sufficient coercivity.

SUMMARY

Exemplary embodiments of the broad inventive principles described herein provide a structure for cooling a rotating electrical machine which can appropriately cool not only a stator but also a rotor.

Exemplary embodiments provide a structure for cooling a rotating electrical machine including an oil pump, a supply oil passage connected to a discharge port of the oil pump, and a first oil passage that is an oil passage located above a stator of the rotating electrical machine in a vertical direction and that has a supplied portion, a discharge hole, and a discharge portion. The supplied portion is connected to the supply oil passage. The discharge hole is formed on a first side in an axial direction, which is one side in the axial direction of the rotating electrical machine with respect to the supplied portion and is configured to discharge oil toward the stator. The discharge portion is formed on the first side with respect to the discharge hole. A second oil passage is formed inside a rotor shaft to which a rotor of the rotating electrical machine is fixed, and a third oil passage connects the discharge portion of the first oil passage and the second oil passage. The third oil passage is formed along a first wall of the case which is located on the first side with respect to the rotating electrical machine.

As such, oil in the first oil passage can be discharged toward the stator through the discharge hole to cool the stator. Moreover, oil can be made to flow through the second oil passage formed inside the rotor shaft to cool the rotor.

Further, the structure includes the third oil passage connecting the discharge portion of the first oil passage and the second oil passage. A part of oil supplied from the supply oil passage to the first oil passage can thus be supplied to the second oil passage through the third oil passage to appropriately cool the rotor. Since the oil passage for supplying oil to the second oil passage and the oil passage for supplying oil to the first oil passage thus have a common part, the oil passage configuration can be restrained from becoming complex.

As described above, the structure for cooling a rotating electrical machine can be implemented which can appropriately cool not only the stator but also the rotor.

Further features and advantages of the structure for cooling a rotating electrical machine will become apparent from the following description of an embodiment given below with reference to the accompanying drawings.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EXEMPLARY EMBODIMENTS

An embodiment of a structure for cooling a rotating electrical machine and a vehicle drive device will be described with reference to the accompanying drawings. In the embodiment described below, a second stator 21 corresponds to the "stator," a second rotor 24 corresponds to the "rotor," a second rotor shaft 26 corresponds to the "rotor shaft," a first discharge port 52a corresponds to the "discharge port," a first supplied portion 91a corresponds to the "supplied portion," a first discharge hole 91b corresponds to the "discharge hole," a fourth oil passage 94 corresponds to the "cooling oil passage," a second rotating electrical machine MG2 corresponds to the "rotating electrical machine," a first oil pump OP1 corresponds to the "oil pump," and a third oil flow tube 43 corresponds to the "tubular member."

In the following description, the vertical direction V (see FIG. 4) means the vertical direction in the state where a rotating electrical machine to be cooled is in use. That is, the vertical direction V means the vertical direction in the case where a rotating electrical machine to be cooled is placed in the orientation in which it is used. In the present embodiment, a structure for cooling a rotating electrical machine is provided in a vehicle drive device. The vertical direction V is therefore the same as the vertical direction in the state where the vehicle drive device is mounted on a vehicle. The terms "above" and "below" mean the upper side and the lower side in the vertical direction V. In the following description, the direction of each member refers to the direction of that member in an assembled device (in the present embodiment, the vehicle drive device) having a structure for cooling a rotating electrical machine. The terms regarding the dimensions, direction, position, etc. of each member are used as a concept including variations due to tolerance (manufacturing tolerance).

As used herein, the expression "drivingly coupled" means the state where two rotary elements are coupled so that a driving force (synonymous with torque) can be transmitted therebetween. This concept includes the state where two rotary elements are coupled so as to rotate together and the state where two rotary elements are coupled via one or more transmission members so that a driving force can be transmitted therebetween via the one or more transmission members. Such transmission members include various members that transmit rotation at the same speed or a shifted speed (a shaft, a gear mechanism, a belt, a chain, etc.) and may include engagement devices that selectively transmit rotation and a driving force (a friction engagement device, a meshing engagement device, etc.). In the case where the expression "drivingly coupled" is used for rotary elements of a planetary gear mechanism, it refers to the state where three rotary elements included in the planetary gear mechanism are drivingly coupled to each other with no other rotary elements interposed therebetween.

As used herein, the term "rotating electrical machine" is used as a concept including a motor (electric motor), a generator (electric generator), and a motor-generator that serves as either a motor or a generator as necessary. As used herein, regarding arrangement of two members, the expression "overlap each other as viewed in a specific direction" means that when an imaginary line parallel to the viewing direction is moved in each direction perpendicular to the imaginary line, the imaginary line crosses both of the two members in at least a part of the range where the imaginary line is moved.

Figure 3:
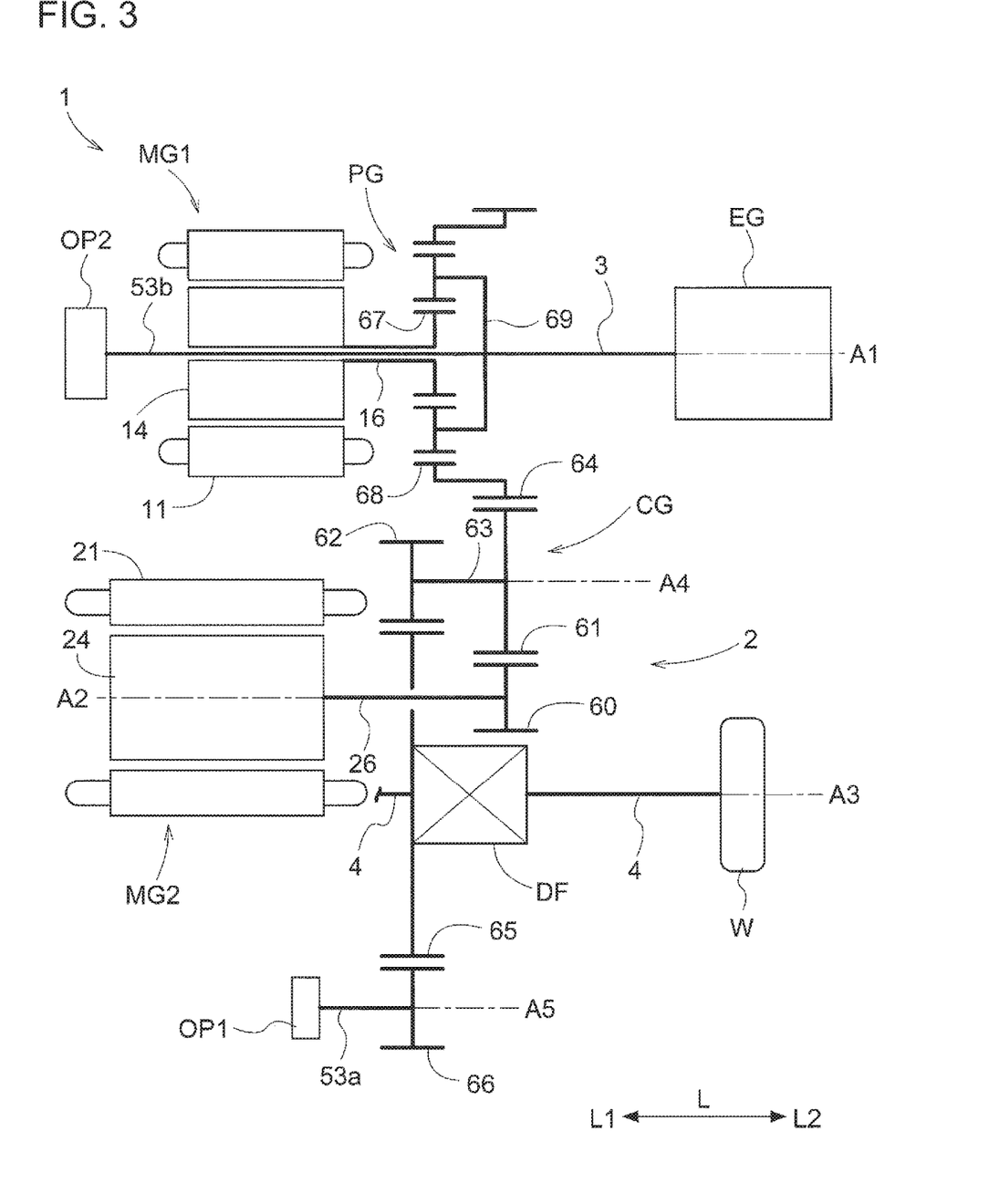
FIG. 3 is a skeleton diagram of the vehicle drive device according to the embodiment.

In the present embodiment, a structure for cooling a rotating electrical machine is provided in a vehicle drive device 1. The vehicle drive device 1 is a device that moves a vehicle by transmitting the driving force of driving force sources (driving force sources for wheels W) to output members 4 drivingly coupled to the wheels W. As shown in FIG. 3, in the present embodiment, the vehicle drive device 1 is a drive device (hybrid vehicle drive device) for driving a vehicle (hybrid vehicle) having both an internal combustion engine EG and a rotating electrical machine (in this example, a first rotating electrical machine MG1 and a second rotating electrical machine MG2) as driving force sources for the wheels W. Specifically, the vehicle drive device 1 is what is called a two-motor power-split hybrid vehicle drive device. The internal combustion engine EG is a motor that is driven by fuel combustion in the engine to output power (e.g., a gasoline engine, a diesel engine, etc.).

Figure 1:
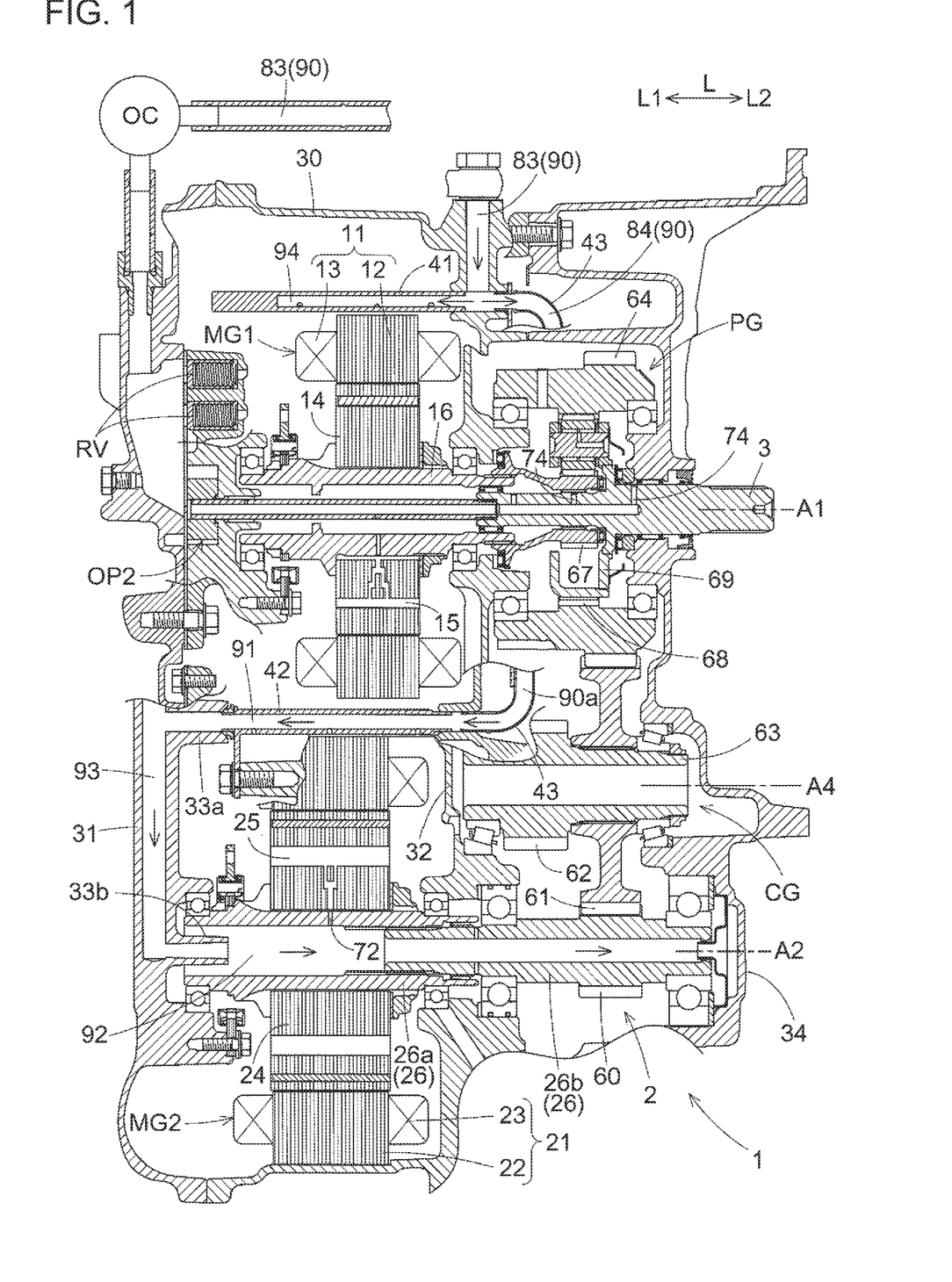
FIG. 1 is a sectional view of a vehicle drive device according to an embodiment.

The structure for cooling a rotating electrical machine according to the present disclosure is a structure for cooling a rotating electrical machine accommodated in a case. That is, the structure for cooling a rotating electrical machine according to the present disclosure is configured to cool a rotating electrical machine accommodated in a case. In the present embodiment, as shown in FIG. 1, the structure for cooling a rotating electrical machine is configured to cool the first rotating electrical machine MG1 and the second rotating electrical machine MG2 which are accommodated in a case 30. That is, in the present embodiment, the vehicle drive device 1 includes a structure for cooling the first rotating electrical machine MG1 and the second rotating electrical machine MG2. Other devices or mechanisms included in the vehicle drive device 1 are also accommodated in the case 30. In the present embodiment, as shown in FIG. 3, the vehicle drive device 1 includes, in addition to the first rotating electrical machine MG1 and the second rotating electrical machine MG2, an input member 3, the output members 4, a planetary gear mechanism PG, a counter gear mechanism CG, an output differential gear unit DF, a first oil pump OP1, and a second oil pump OP2. The input member 3, the output members 4, the planetary gear mechanism PG, the counter gear mechanism CG, the output differential gear unit DF, the first oil pump OP1, and the second oil pump OP2 are also accommodated in the case 30.

Figure 4:
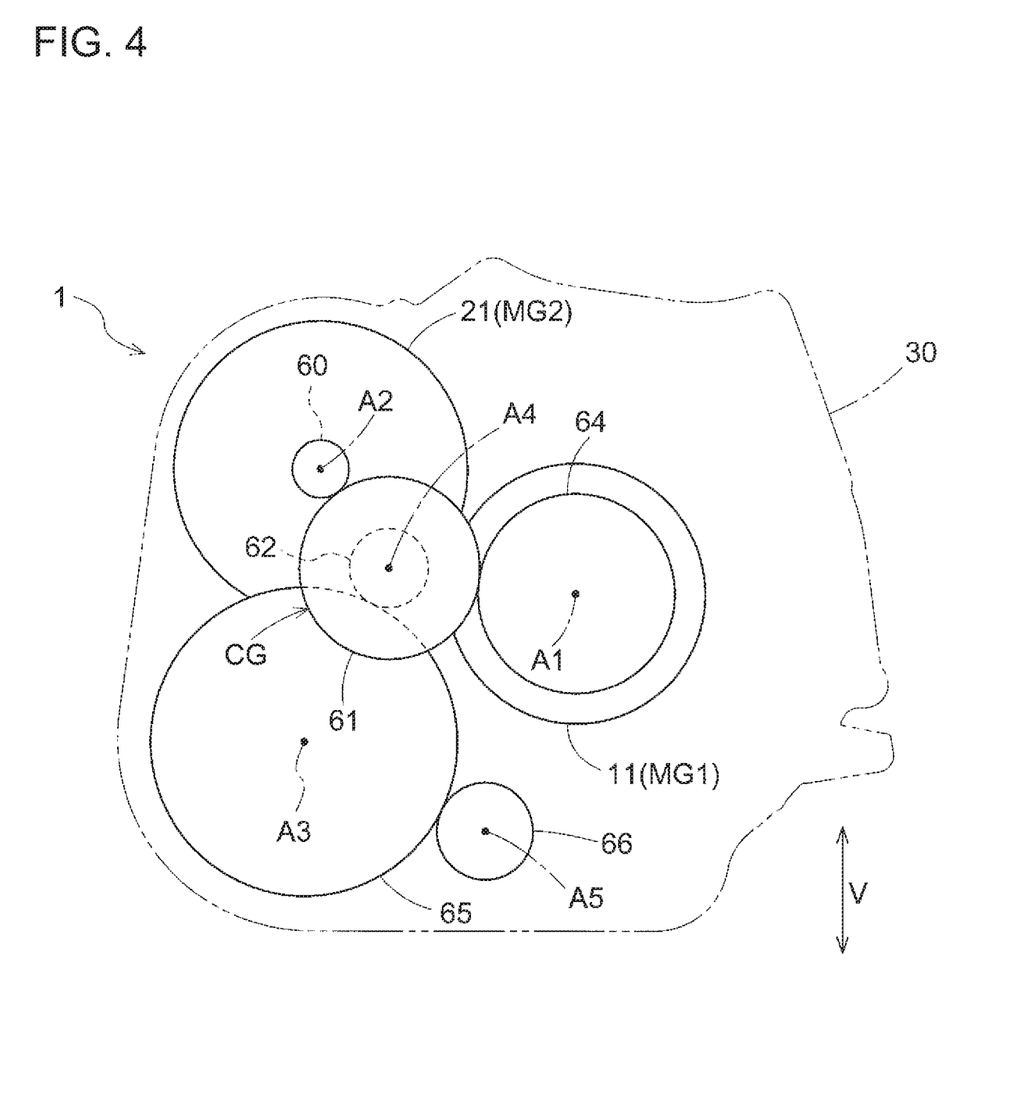
FIG. 4 is a diagram showing the positional relationship of parts of the vehicle drive device according to the embodiment as viewed in an axial direction.

As shown in FIGS. 3 and 4, the first rotating electrical machine MG1, the input member 3, the planetary gear mechanism PG, and the second oil pump OP2 are placed on a first axis A1, the second rotating electrical machine MG2 is placed on a second axis A2, the output members 4 and the output differential gear unit DF are placed on a third axis A3, the counter gear mechanism CG is placed on a fourth axis A4, and the first oil pump OP1 is placed on a fifth axis A5. The first axis A1, the second axis A2, the third axis A3, the fourth axis A4, and the fifth axis A5 are axes (imaginary axes) that are different from each other and located parallel to each other. In the following description, the "axial direction L" refers to the direction parallel to these axes (A1 to A5) (i.e., the common axial direction of these axes). The "first side L1 in the axial direction" refers to one side in the axial direction L, and the "second side L2 in the axial direction" refers to the other side in the axial direction L (i.e., the opposite side in the axial direction L to the first side L1 in the axial direction). In the present embodiment, the vehicle drive device 1 is mounted on the vehicle in such an orientation that the axial direction L extends along a horizontal plane. In the present embodiment, the vehicle drive device 1 is mounted on the vehicle in such an orientation that the axial direction L extends in the lateral direction of the vehicle.

As shown in FIG. 1, the first rotating electrical machine MG1 includes a first stator 11 and a first rotor 14. The first rotor 14 is supported so as to be rotatable relative to the first stator 11. The first stator 11 includes a first stator core 12 and first coil end portions 13. The first stator core 12 is fixed to the case 30. The first stator core 12 has a coil wound therein, and the first coil end portions 13 are parts of the coil which protrude from the first stator core 12 in the axial direction L. The first stator 11 includes the first coil end portions 13 on both sides of the first stator core 12 in the axial direction L. The first rotor 14 is fixed to a first rotor shaft 16 and rotates with the first rotor shaft 16. In the present embodiment, the first rotating electrical machine MG1 is a permanent magnet rotating electrical machine (in this example, an interior permanent magnet (IPM) synchronous motor), and the first rotor 14 has a rotor core and permanent magnets embedded in the rotor core. In the present embodiment, the first rotating electrical machine MG1 is an inner rotor rotating electrical machine, and the first rotor 14 is disposed radially (about the first axis A1) inside the first stator core 12.

As shown in FIG. 1, the second rotating electrical machine MG2 includes the second stator 21 and the second rotor 24. The second rotor 24 is supported so as to be rotatable relative to the second stator 21. The second stator 21 includes a second stator core 22 and second coil end portions 23. The second stator core 22 is fixed to the case 30. The second stator core 22 has a coil wound therein, and the second coil end portions 23 are parts of the coil which protrude from the second stator core 22 in the axial direction L. The second stator 21 includes the second coil end portions 23 on both sides in the axial direction L of the second stator core 22. The second rotor 24 is fixed to the second rotor shaft 26 and rotates with the second rotor shaft 26. In the present embodiment, the second rotating electrical machine MG2 is a permanent magnet rotating electrical machine (in this example, an IPM synchronous motor), and the second rotor 24 has a rotor core and permanent magnets embedded in the rotor core. In the present embodiment, the second rotating electrical machine MG2 is an inner rotor rotating electrical machine, and the second rotor 24 is disposed radially (about the second axis A2) inside the second stator core 22.

The planetary gear mechanism PG includes a first rotary element 67, a second rotary element 68, and a third rotary element 69. The first rotary element 67 is drivingly coupled to the first rotating electrical machine MG1, the second rotary element 68 is drivingly coupled to the output members 4, and the third rotary element 69 is drivingly coupled to the input member 3. In the present embodiment, the first rotary element 67 is coupled to the first rotating electrical machine MG1 (the first rotor shaft 16) so as to rotate therewith, the second rotary element 68 is coupled to a distribution output gear 64 so as to rotate therewith, and the third rotary element 69 is coupled to the input member 3 so as to rotate therewith. The distribution output gear 64 meshes with a first gear 61, described below, of the counter gear mechanism CG. The input member 3 is a member (in the present embodiment, a shaft member) drivingly coupled to the internal combustion engine EG (an output shaft such as a crankshaft). The input member 3 is coupled to the internal combustion engine EG so as to rotate therewith or is coupled to the internal combustion engine EG via other members such as a damper and a clutch. The output members 4 are members drivingly coupled to the wheels W. In the present embodiment, the output members 4 are members that rotate with the wheels W. That is, the output members 4 are members (e.g., side gears) in the output differential gear unit DF which rotate with the wheels W or members that form driveshafts coupling the output differential gear unit DF and the wheels W.

In the present embodiment, the planetary gear mechanism PG is a single-pinion type planetary gear mechanism. In the present embodiment, the first rotary element 67 is a sun gear, the second rotary element 68 is a ring gear, and the third rotary element 69 is a carrier. The planetary gear mechanism PG is thus configured to distribute the torque of the internal combustion engine EG which is transmitted to the third rotary element 69 to the first rotary element 67 and the second rotary element 68 (i.e., distribute this torque to the first rotating electrical machine MG1 and the output members 4).

The counter gear mechanism CG includes the first gear 61, a second gear 62, and a coupling shaft 63. The first gear 61 meshes with the distribution output gear 64, the second gear 62 meshes with a differential input gear 65 of the output differential gear unit DF. The coupling shaft 63 couples the first gear 61 and the second gear 62. In the present embodiment, an output gear 60 of the second rotating electrical machine MG2 also meshes with the first gear 61. The output gear 60 is a gear for outputting the torque of the second rotating electrical machine MG2 and is coupled to the second rotor shaft 26 so as to rotate therewith. In the present embodiment, the second rotor shaft 26 includes a first shaft member 26a and a second shaft member 26b which are coupled (in this example, spline-coupled) to each other. The first shaft member 26a is disposed so as to extend toward the first side L1 in the axial direction from the joint portion between the first shaft member 26a and the second shaft member 26b. The second shaft member 26b is disposed so as to extend toward the second side L2 in the axial direction from the joint portion between the first shaft member 26a and the second shaft member 26b. The second rotor 24 is fixed to the outer peripheral surface of the first shaft member 26a, and the output gear 60 is formed on the outer peripheral surface of the second shaft member 26b. In the present embodiment, the end of the second rotor shaft 26 on the second side L2 in the axial direction (in this example, the end of the second shaft member 26b on the second side L2 in the axial direction) is located on the second side L2 in the axial direction with respect to a second wall 32 described below. The output gear 60 is also located on the second side L2 in the axial direction with respect to the second wall 32.

The output differential gear unit DF transmits the torque applied to the differential input gear 65 by distributing this torque to the pair of right and left output members 4 (i.e., distributing this torque to the pair of right and left wheels W). For example, the output differential gear unit DF is formed by using a bevel gear type or planetary gear type differential gear mechanism.

The vehicle drive device 1 according to the present embodiment is configured as described above. Accordingly, in a stepless shift drive mode in which the torque of the internal combustion engine EG is transmitted to the wheels W to move the vehicle, the first rotating electrical machine MG1 outputs reaction torque to the torque distributed to the first rotary element 67. At this time, the first rotating electrical machine MG1 basically serves as a generator and generates electricity by the torque distributed to the first rotary element 67. Moreover, in the stepless shift drive mode, the torque reduced from the torque of the internal combustion engine EG is distributed to the second rotary element 68 as torque for driving the wheels W, and the second rotating electrical machine MG2 outputs torque so as to compensate for a shortfall in required wheel torque (torque required to be transmitted to the wheels W) as necessary. In an electric drive mode in which only the torque of the second rotating electrical machine MG2 is transmitted to the wheels W to move the vehicle, the internal combustion engine EG is basically in a stopped state where fuel supply to the internal combustion engine EG is stopped, and the first rotating electrical machine MG1 is basically in an idle state (the state where the first rotating electrical machine MG1 is controlled by zero torque control so that its output torque becomes zero).

The vehicle drive device 1 includes a drive transmission mechanism 2 that transmits the driving force of the second rotating electrical machine MG2 to the output members 4. In the present embodiment, the drive transmission mechanism 2 includes the counter gear mechanism CG and the output differential gear unit DF. In the present embodiment, the second rotating electrical machine MG2 is disposed so as to overlap the drive transmission mechanism 2 as viewed in the axial direction L. Specifically, as shown in FIG. 4, the second rotating electrical machine MG2 is disposed so as to overlap the counter gear mechanism CG as viewed in the axial direction L. In this example, the second rotating electrical machine MG2 is disposed so as to overlap the fourth axis A4 on which the counter gear mechanism CG is placed, as viewed in the axial direction L. In FIG. 4, reference pitch circles are shown for the gears, the outer shape of the first stator 11 (the outer shape of the first stator core 12) is shown for the first rotating electrical machine MG1, and the outer shape of the second stator 21 (the outer shape of the second stator core 22) is shown for the second rotating electrical machine MG2.

In the present embodiment, as shown in FIG. 1, the drive transmission mechanism 2 is disposed on the opposite side in the axial direction L (the second side L2 in the axial direction) of the second rotating electrical machine MG2 from the first side L1 in the axial direction. As described above, in the present embodiment, the drive transmission mechanism 2 includes the counter gear mechanism CG, and the counter gear mechanism CG is disposed on the second side L2 in the axial direction with respect to the second rotating electrical machine MG2. Specifically, the case 30 includes a first wall 31 and the second wall 32. The first wall 31 is located on the first side L1 in the axial direction with respect to the second rotating electrical machine MG2, and the second wall 32 is located on the second side L2 in the axial direction with respect to the second rotating electrical machine MG2. The first wall 31 and the second wall 32 are support walls that support the second rotor shaft 26. In this example, the case 30 further includes a third wall 34, and the third wall 34 is located on the second side L2 in the axial direction with respect to the second wall 32. The third wall 34 is also a support wall that supports the second rotor shaft 26. Specifically, the first shaft member 26a is rotatably supported at two points in the axial direction L by the first and second walls 31, 32, and the second shaft member 26b is rotatably supported at two points in the axial direction L by the second and third walls 32, 34. The counter gear mechanism CG is disposed on the second side L2 in the axial direction with respect to the second wall 32. The counter gear mechanism CG is also disposed on the first side L1 in the axial direction with respect to the third wall 34. In this example, the first wall 31 is located on the first side L1 in the axial direction with respect to the second rotating electrical machine MG2 so as to be adjacent to the second rotating electrical machine MG2, and the second wall 32 is located on the second side L2 in the axial direction with respect to the second rotating electrical machine MG2 so as to be adjacent to the second rotating electrical machine MG2. In the present embodiment, the first wall 31 is a separate member from a peripheral wall (a cylindrical wall surrounding the second rotating electrical machine MG2 etc. as viewed in the axial direction L) of the case 30 and is joined to the peripheral wall of the case 30 from the first side L1 in the axial direction so as to cover the opening on the first side L1 in the axial direction of the peripheral wall. That is, in the present embodiment, the first wall 31 is a cover member (specifically, a rear cover that covers the opening on the opposite side of the peripheral wall from the side on which the internal combustion engine EG is disposed).

Figure 5:
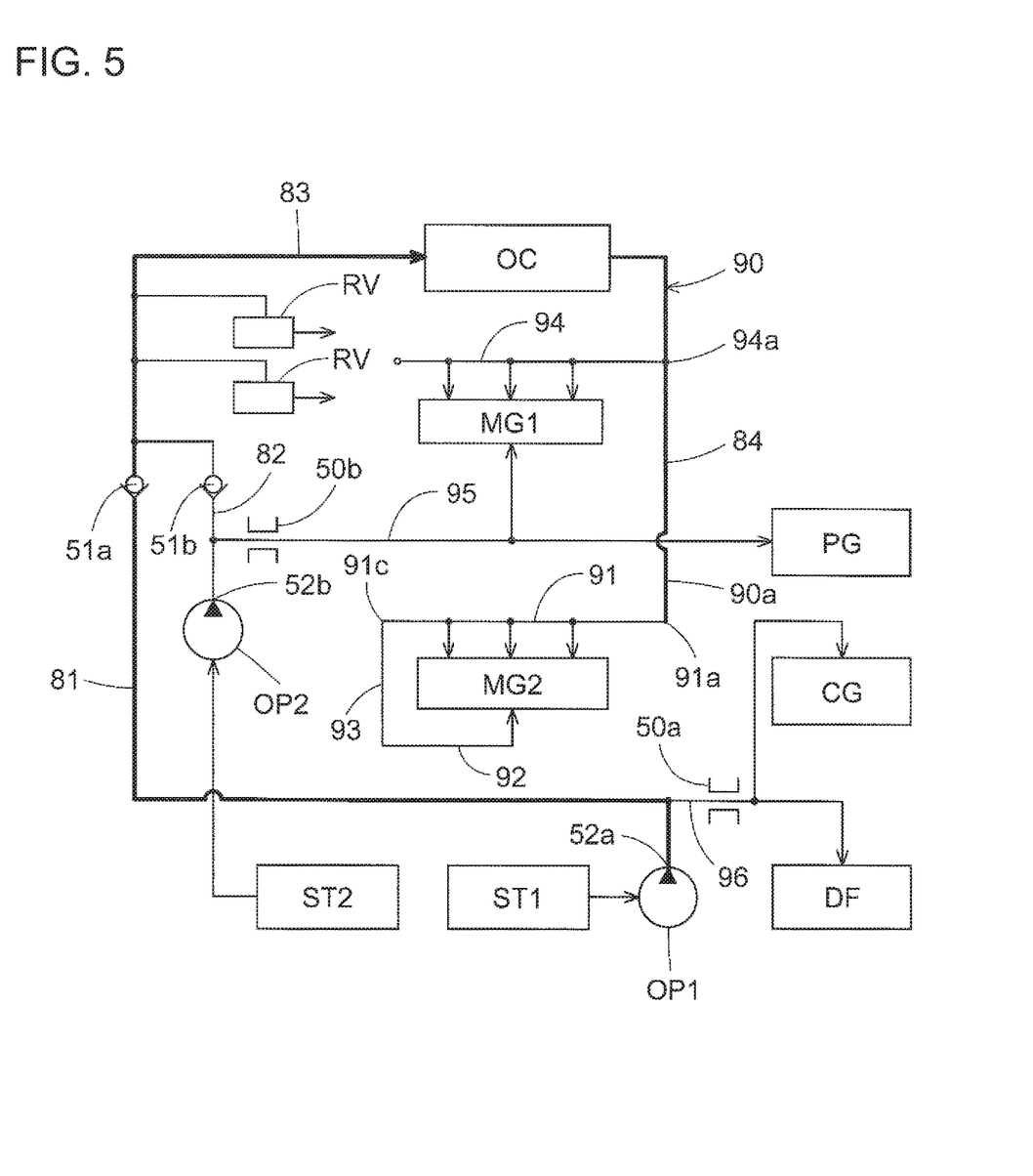
FIG. 5 is a simplified schematic of a hydraulic circuit according to the embodiment.

As shown in FIG. 3, the vehicle drive device 1 includes the first oil pump OP1. In the present embodiment, the first oil pump OP1 is placed on a different axis from the second rotating electrical machine MG2. The first oil pump OP1 may be placed coaxially with the second rotating electrical machine MG2. Although not shown in the figures, an oil reservoir portion for storing oil is formed in the case 30. As shown in FIG. 5, the first oil pump OP1 sucks oil from the oil reservoir portion through a first strainer ST1. As shown in FIG. 3, in the present embodiment, the vehicle drive device 1 further includes the second oil pump OP2. In the present embodiment, the second oil pump OP2 is placed coaxially with the first rotating electrical machine MG1. As shown in FIG. 5, the second oil pump OP2 sucks oil from the oil reservoir portion through a second strainer ST2. The first strainer ST1 and the second strainer ST2 are filters for removing foreign matter contained in oil. In this example, the first strainer ST1 that filters oil sucked from the oil reservoir portion by the first oil pump OP1 and the second strainer ST2 that filters oil sucked from the oil reservoir portion by the second oil pump OP2 are separate strainers. However, the first oil pump OP1 and the second oil pump OP2 may be configured to suck oil from the oil reservoir portion through a common strainer.

In the present embodiment, the first oil pump OP1 is driven by rotation of the drive transmission mechanism 2. Specifically, the first oil pump OP1 is configured to be driven by rotation of a rotary member that is included in the drive transmission mechanism 2 and that is inseparably drivingly coupled to the wheels W (i.e., a rotary member that always rotates synchronously with the wheels W). Accordingly, while the vehicle is moving, the first oil pump OP1 can be driven regardless of whether the current drive mode is the stepless shift drive mode or the electric drive mode (i.e., even while the internal combustion engine EG is stopped). In the present embodiment, as shown in FIG. 3, the first oil pump OP1 is configured to be driven by rotation of the differential input gear 65 of the output differential gear unit DF. Specifically, a first pump drive shaft 53a, which is a drive shaft for the first oil pump OP1, has a pump drive gear 66 thereon. As the pump drive gear 66 meshes with the differential input gear 65, the first oil pump OP1 is driven by rotation of the differential input gear 65.

The pump drive gear 66 may be configured to mesh with a gear (in the present embodiment, the output gear 60, the first gear 61, or the second gear 62) other than the differential input gear 65 included in the drive transmission mechanism 2 or to mesh with a gear (in the present embodiment, the distribution output gear 64) that meshes with the gear included in the drive transmission mechanism 2 so that the first oil pump OP1 is driven by rotation of the drive transmission mechanism 2. The first pump drive shaft 53a and the rotary member included in the drive transmission mechanism 2 (or a rotary member that rotates synchronously with the rotary member included in the drive transmission mechanism 2) may be coupled via a wrapping transmission mechanism (a mechanism using a chain and sprockets, a mechanism using a belt and pulleys, etc.) so that the first oil pump OP1 is driven by rotation of the drive transmission mechanism 2.

Figure 2:
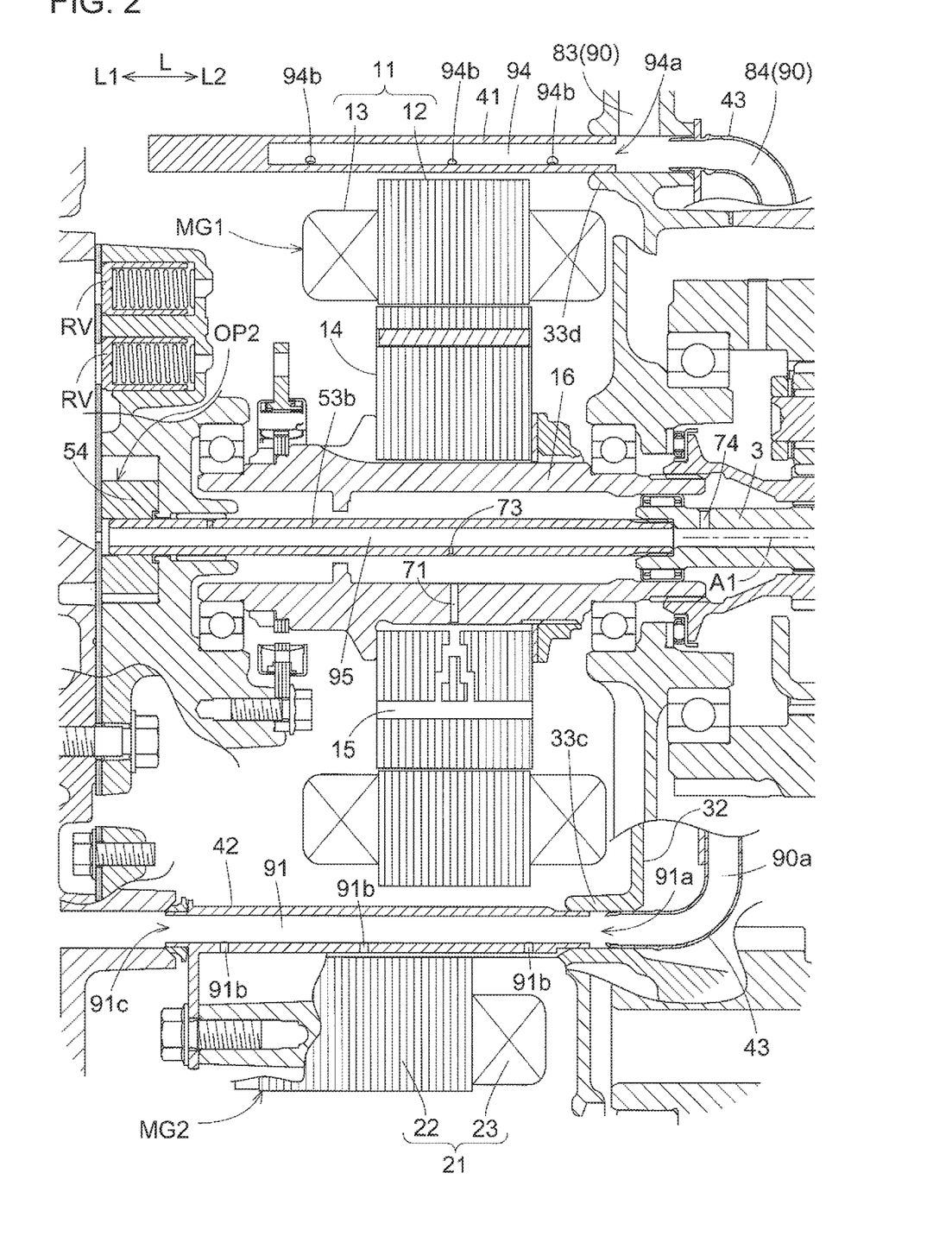
FIG. 2 is a partial enlarged view of FIG. 1.

In the present embodiment, the second oil pump OP2 is driven by rotation of the input member 3. Specifically, a second pump drive shaft 53b, which is a drive shaft for the second oil pump OP2, is coupled to the input member 3 so as to rotate therewith. As shown in FIG. 2, the second pump drive shaft 53b is coupled to a pump rotor 54 of the second oil pump OP2 so as to rotate therewith. Accordingly, the second oil pump OP2 can be driven by the torque of the internal combustion engine EG regardless of whether the vehicle is moving or not. At least one of the first oil pump OP1 and the second oil pump OP2 may be an electric oil pump that is driven by a special electric motor exclusively for driving a pump.

Next, the structure for cooling a rotating electrical machine according to the present embodiment will be specifically described. As described below, the structure for cooling a rotating electrical machine includes the first oil pump OP1, a supply oil passage 90, a first oil passage 91, a second oil passage 92, and a third oil passage 93, so that the second rotating electrical machine MG2 can be cooled by oil discharged from the first oil pump OP1. That is, the structure for cooling the second rotating electrical machine MG2 includes the first oil pump OP1, the supply oil passage 90, the first oil passage 91, the second oil passage 92, and the third oil passage 93. In the present embodiment, the structure for cooling a rotating electrical machine further includes a fourth oil passage 94, so that the first rotating electrical machine MG1 can be cooled by oil discharged from the first oil pump OP1. In the present embodiment, the structure for cooling a rotating electrical machine further includes an oil cooler OC.

As shown in FIG. 5, the supply oil passage 90 is connected to a first discharge port 52a, which is a discharge port of the first oil pump OP1. In FIG. 5, the line representing the supply oil passage 90 is shown thicker than the lines representing other oil passages. In FIG. 5, the oil flow direction in each oil passage is shown by arrow. In the present embodiment, the supply oil passage 90 includes a first discharge oil passage 81, a merged oil passage 83, and a downstream-side oil passage 84 in this order from the upstream side. Specifically, the upstream-side end of the first discharge oil passage 81 is connected to the first discharge port 52a, and the downstream-side end of the first discharge oil passage 81 is connected to the upstream-side end of the merged oil passage 83. The downstream-side end of the merged oil passage 83 is connected to the upstream-side end of the downstream-side oil passage 84, and the downstream-side end of the downstream-side oil passage 84 is connected to the upstream-side end (a first supplied portion 91a described below) of the first oil passage 91. Accordingly, oil discharged from the first oil pump OP1 sequentially flows through the first discharge oil passage 81, the merged oil passage 83, and the downstream-side oil passage 84 in this order and is supplied to the first oil passage 91. A first check valve 51a that does not allow oil to flow upstream is disposed in the first discharge oil passage 81.

As described above, in the present embodiment, the vehicle drive device 1 includes the second oil pump OP2 in addition to the first oil pump OP1. In the present embodiment, the upstream-side end of a second discharge oil passage 82 is connected to a second discharge port 52b, which is a discharge port of the second oil pump OP2, and the downstream-side end of the second discharge oil passage 82 is connected to the upstream-side end of the merged oil passage 83. That is, the merged oil passage 83 is an oil passage into which the first discharge oil passage 81 and the second discharge oil passage 82 merge. A second check valve 51b that does not allow oil to flow upstream is disposed in the second discharge oil passage 82.

As shown in FIG. 5, in the present embodiment, the oil cooler OC is disposed in the supply oil passage 90. The oil cooler OC is a heat exchanger that cools oil. For example, the oil cooler OC is a water or air oil cooler. In the present embodiment, the oil cooler OC is disposed in the merged oil passage 83. A relief valve RV (in the present embodiment, two relief valves RV) is disposed in a part of the merged oil passage 83 which is located upstream of the oil cooler OC. When the oil pressure in the merged oil passage 83 becomes too high, the relief valve RV discharges a part of oil to adjust the oil pressure in the merged oil passage 83.

As shown in FIG. 2, the first oil passage 91 is located above the second stator 21 in the vertical direction V (see FIG. 4). The first oil passage 91 has the first supplied portion 91a, first discharge holes 91b, and a discharge portion 91c. The first supplied portion 91a is connected to the supply oil passage 90 (in the present embodiment, the downstream-side oil passage 84). The first discharge holes 91b are formed on the first side L1 in the axial direction with respect to the first supplied portion 91a and discharge oil toward the second stator 21. The discharge portion 91c is formed on the first side L1 in the axial direction with respect to the first discharge holes 91b. Oil supplied from the supply oil passage 90 to the first oil passage 91 can thus be discharged toward the second stator 21 through the first discharge holes 91b to cool the second stator 21.

The first oil passage 91 is disposed so as to overlap the second stator 21 as viewed in the vertical direction V. As shown in FIG. 2, in the present embodiment, the first oil passage 91 has the first discharge hole 91b formed at a position overlapping the second coil end portion 23 on the first side L1 in the axial direction as viewed in the vertical direction V, the first discharge hole 91b formed at a position overlapping the second coil end portion 23 on the second side L2 in the axial direction as viewed in the vertical direction V, and the first discharge hole 91b formed at a position overlapping the second stator core 22 as viewed in the vertical direction V. Oil discharged through the first discharge holes 91b can thus be supplied to the second stator 21 by a relatively simple configuration using gravity.

The first oil passage 91 is an oil passage whose both ends are the first supplied portion 91a and the discharge portion 91c, and the discharge portion 91c is located on the first side L1 in the axial direction with respect to the first supplied portion 91a. The first oil passage 91 thus extends at least between the first supplied portion 91a and the discharge portion 91c in the axial direction L. In the present embodiment, the first oil passage 91 does not have a bent portion that reverses the oil flow from the first supplied portion 91a toward the discharge portion 91c in the axial direction L, and the first oil passage 91 is formed so as to extend uniformly from the first supplied portion 91a to the discharge portion 91c toward the first side L1 in the axial direction. That is, as the oil flow direction in each oil passage is shown by arrow in FIG. 1, oil flows toward the first side L1 in the axial direction in the first oil passage 91. The first oil passage 91 may extend in a direction parallel to the axial direction L or a direction tilted with respect to the axial direction L.

As shown in FIG. 1, the second oil passage 92 is an oil passage formed in the second rotor shaft 26 having the second rotor 24 of the second rotating electrical machine MG2 fixed thereto. The second rotor shaft 26 is formed by a cylindrical member extending in the axial direction L, and the second oil passage 92 extending in the axial direction L is formed by the space surrounded by the inner peripheral surface of the second rotor shaft 26. The second rotor 24 can thus be cooled by oil supplied to the second oil passage 92. Oil flows toward the second side L2 in the axial direction in the second oil passage 92. As described above, in the present embodiment, the second rotor shaft 26 includes the first shaft member 26a and the second shaft member 26b which are coupled to each other. A part of the second oil passage 92 which is located on the first side L1 in the axial direction is formed inside the first shaft member 26a, and a part of the second oil passage 92 which is located on the second side L2 in the axial direction formed inside the second shaft member 26b.

In the present embodiment, as shown in FIG. 1, the second rotor shaft 26 (in this example, the first shaft member 26a) has a second oil hole 72 that extends between the inner and outer peripheral surfaces of the second rotor shaft 26 so as to provide communication between the inside and outside of the second rotor shaft 26. The second oil hole 72 is formed so as to extend through a cylindrical portion of the second rotor shaft 26 in the radial direction (the radial direction about the second axis A2; the same applies to the following description in this paragraph). A second rotor oil passage 25 is formed inside the second rotor 24 (the rotor core of the second rotor 24). Although not described in detail, the second rotor oil passage 25 has an axial oil passage and a radial oil passage. The axial oil passage extends in the axial direction L. The radial oil passage extends in the radial direction between the inner peripheral surface of the second rotor 24 (the rotor core) and the axial oil passage so as to provide communication between the space surrounded by the inner peripheral surface of the second rotor 24 (the rotor core) and the axial oil passage. Oil in the second oil passage 92 can thus be supplied to the second rotor oil passage 25 through the second oil hole 72 to cool the second rotor 24. In the present embodiment, the axial oil passage of the second rotor oil passage 25 is formed so as to open at both ends of the second rotor 24 (the rotor core) in the axial direction L. Oil having cooled the second rotor 24 can thus be supplied from inside in the radial direction to the second coil end portions 23 to cool the second coil end portions 23.

As described above, the first oil pump OP1 is placed on a different axis from the second rotating electrical machine MG2 (i.e., on a different axis from the second rotor shaft 26). In this case, depending on the configuration of the vehicle drive device 1, it may be difficult, due to constraints on the space in the vehicle in which the vehicle drive device 1 is mounted etc., to form an oil passage directly connecting the first discharge port 52a of the first oil pump OP1 and the second oil passage 92 formed inside the second rotor shaft 26. In view of this, the structure for cooling a rotating electrical machine has the third oil passage 93 connecting the discharge portion 91c of the first oil passage 91 and the second oil passage 92. The third oil passage 93 is formed along the first wall 31 of the case 30 which is located on the first side L1 in the axial direction with respect to the second rotating electrical machine MG2. Specifically, at least a part of the third oil passage 93 is formed along the first wall 31. In the present embodiment, the third oil passage 93 except for its upstream-side and downstream-side ends is formed along the first wall 31. Since the third oil passage 93 is thus formed along the first wall 31, the third oil passage 93 for supplying oil discharged from the first oil pump OP1 to the second oil passage 92 can be formed while restraining an increase in size in the axial direction L of the vehicle drive device 1 in the portion where the third oil passage 93 is formed (i.e., the portion where the second rotating electrical machine MG2 is disposed).

In the present embodiment, as shown in FIGS. 1 and 2, a connection portion 90a, namely a part of the supply oil passage 90 which is connected to the first supplied portion 91a, is formed along the second wall 32 of the case 30 which is located on the second side L2 in the axial direction with respect to the second rotating electrical machine MG2. The connection portion 90a is a part including the downstream-side end of the supply oil passage 90 (in the present embodiment, the downstream-side oil passage 84), and at least a part of the connection portion 90a is formed along the second wall 32.

As shown in FIG. 1, in the present embodiment, the third oil passage 93 is formed inside the first wall 31. At least a part of the third oil passage 93 may be formed outside the first wall 31 (e.g., may be formed inside a tubular member attached to the first wall 31 from the second side L2 in the axial direction). In the present embodiment, the first wall 31 has a second connection portion 33b. The second connection portion 33b has a cylindrical shape protruding toward the second side L2 in the axial direction, and the opening on the second side L2 in the axial direction of the second connection portion 33b is located inside the second rotor shaft 26. The downstream-side end of the third oil passage 93 is formed by the space surrounded by the inner peripheral surface of the second connection portion 33b. The downstream-side end of the third oil passage 93 and the upstream-side end of the second oil passage 92 are thus connected in the second connection portion 33b.

In the present embodiment, the structure for cooling a rotating electrical machine further includes the fourth oil passage 94 through which oil for cooling the first rotating electrical machine MG1 flows. As shown in FIG. 5, the fourth oil passage 94 is formed so as to branch from a part of the supply oil passage 90 which is located downstream of the oil cooler OC. Oil cooled by the oil cooler OC can thus be supplied not only to the first oil passage 91 and the second oil passage 92 but also to the fourth oil passage 94.

As shown in FIG. 2, the fourth oil passage 94 is located above the first stator 11 in the vertical direction V (see FIG. 4). The fourth oil passage 94 has a second supplied portion 94a and second discharge holes 94b. The second supplied portion 94a is connected to an intermediate part of the supply oil passage 90 (in the present embodiment, the downstream-side end of the merged oil passage 83, namely the upstream-side end of the downstream-side oil passage 84). The second discharge holes 94b are formed on the first side L1 in the axial direction with respect to the second supplied portion 94a and discharge oil toward the first stator 11. Oil supplied from the supply oil passage 90 to the fourth oil passage 94 can thus be discharged toward the first stator 11 through the second discharge holes 94b to cool the first stator 11.

The fourth oil passage 94 is disposed so as to overlap the first stator 11 as viewed in the vertical direction V. As shown in FIG. 2, in the present embodiment, the fourth oil passage 94 has the second discharge hole 94b formed at a position overlapping the first coil end portion 13 on the first side L1 in the axial direction as viewed in the vertical direction V, the second discharge hole 94b formed at a position overlapping the first coil end portion 13 on the second side L2 in the axial direction as viewed in the vertical direction V, and the second discharge hole 94b formed at a position overlapping the first stator core 12 as viewed in the vertical direction V. Oil discharged through the second discharge holes 94b can thus be supplied to the first stator 11 by a relatively simple configuration using gravity.

As shown in FIGS. 2 and 5, in the present embodiment, the structure for cooling a rotating electrical machine further includes a fifth oil passage 95. As shown in FIG. 2, the fifth oil passage 95 is an oil passage formed inside the second pump drive shaft 53b. The second pump drive shaft 53b is formed by a cylindrical member extending in the axial direction L, and the fifth oil passage 95 extending in the axial direction L is formed by the space surrounded by the inner peripheral surface of the second pump drive shaft 53b. As shown in FIG. 5, the fifth oil passage 95 is formed so as to branch from a part of the second discharge oil passage 82 which is located upstream of the second check valve 51b. The amount of oil that flows from the second discharge oil passage 82 into the fifth oil passage 95 is controlled by a second orifice 50b.

Oil flows toward the second side L2 in the axial direction in the fifth oil passage 95. As shown in FIG. 5, oil in the fifth oil passage 95 is supplied to the first rotating electrical machine MG1 (the first rotor 14) for cooling and is also supplied to the planetary gear mechanism PG for lubrication. Specifically, as shown in FIG. 2, the first rotor shaft 16 is formed by a cylindrical member extending in the axial direction L, and the second pump drive shaft 53*b* is disposed in the space surrounded by the inner peripheral surface of the first rotor shaft 16. The second pump drive shaft 53*b* has a third oil hole 73 that extends between the inner and outer peripheral surfaces of the second pump drive shaft 53*b* so as to provide communication between the inside and outside of the second pump drive shaft 53*b*. The third oil hole 73 is formed so as to extend through a cylindrical portion of the second pump drive shaft 53*b* in the radial direction (the radial direction about the first axis A1; the same applies to the following description in this paragraph). The first rotor shaft 16 has a first oil hole 71 that extends between the inner and outer peripheral surfaces of the first rotor shaft 16 so as to provide communication between the inside and outside of the first rotor shaft 16. The first oil hole 71 is formed so as to extend through a cylindrical portion of the first rotor shaft 16 in the radial direction. A first rotor oil passage 15 is formed inside the first rotor 14 (the rotor core of the first rotor 14). Although not described in detail, the first rotor oil passage 15 includes an axial oil passage and a radial oil passage. The axial oil passage extends in the axial direction L. The radial oil passage extends in the radial direction between the inner peripheral surface of the first rotor 14 (the rotor core) and the axial oil passage so as to provide communication between the space surrounded by the inner peripheral surface of the first rotor 14 (the rotor core) and the axial oil passage.

Oil in the fifth oil passage 95 can thus be supplied to the inner peripheral surface of the first rotor shaft 16 through the third oil hole 73 and the oil supplied to the inner peripheral surface of the first rotor shaft 16 can be supplied to the first rotor oil passage 15 through the first oil hole 71 to cool the first rotor 14. In the present embodiment, the axial oil passage of the first rotor oil passage 15 is formed so as to open at both ends of the first rotor 14 (the rotor core) in the axial direction L. Oil having cooled the first rotor 14 can therefore be supplied from inside in the radial direction (the radial direction about the first axis A1) to the first coil end portions 13 to cool the first coil end portions 13. Oil in the fifth oil passage 95 also flows into an oil passage formed inside the input member 3 and is then supplied through a fourth oil hole 74 (see FIGS. 1 and 2) formed in the input member 3 to the planetary gear mechanism PG etc. for lubrication.

As shown in FIG. 5, in the present embodiment, the structure for cooling a rotating electrical machine further includes a sixth oil passage 96. The sixth oil passage 96 is formed so as to branch from a part of the first discharge oil passage 81 which is located upstream of the first check valve 51*a*. Oil in the sixth oil passage 96 is supplied to the counter gear mechanism CG and the output differential gear unit DF for lubrication. The amount of oil that flows from the first discharge oil passage 81 into the sixth oil passage 96 is controlled by a first orifice 50*a*.

As shown in FIGS. 1 and 2, in the present embodiment, the vehicle drive device 1 includes a tubular first oil flow tube 41, a tubular second oil flow tube 42, and a tubular third oil flow tube 43. The fourth oil passage 94 is formed inside the first oil flow tube 41, the first oil passage 91 is formed inside the second oil flow tube 42, and the downstream-side oil passage 84 is formed inside the third oil flow tube 43. That is, in the present embodiment, the supply oil passage 90 is formed by using the third oil flow tube 43 that is a tubular member. Specifically, the downstream-side oil passage 84 included in the supply oil passage 90 is formed by using the third oil flow tube 43 that is a tubular member. As shown in FIG. 1, in the present embodiment, the first wall 31 has a first connection portion 33*a* having a cylindrical shape protruding toward the second side L2 in the axial direction, and the upstream end of the third oil passage 93 is formed by the space surrounded by the inner peripheral surface of the first connection portion 33*a*. The second oil flow tube 42 is disposed such that the discharge portion 91*c* is connected to the first connection portion 33*a*. The downstream-side end (the discharge portion 91*c*) of the first oil passage 91 and the upstream-side end of the third oil passage 93 are thus connected in the first connection portion 33*a*. The second oil flow tube 42 is disposed such that its both ends are located at different positions in the axial direction L (e.g., is disposed so as to extend in the axial direction L), and the discharge portion 91*c* of the first oil passage 91 is formed by the opening on the first side L1 in the axial direction of the second oil flow tube 42. The first discharge holes 91*b* are formed so as to extend through a cylindrical portion of the second oil flow tube 42.

As shown in FIG. 2, in the present embodiment, the second wall 32 includes a third connection portion 33*c* having a cylindrical shape extending in the axial direction L. The end of the second oil flow tube 42 on the second side L2 in the axial direction is fitted in the third connection portion 33*c* from the first side L1 in the axial direction, and an end of the third oil flow tube 43 is fitted in the third connection portion 33*c* from the second side L2 in the axial direction. The downstream-side end of the downstream-side oil passage 84 and the upstream-side end (the first supplied portion 91*a*) of the first oil passage 91 are thus connected in the third connection portion 33*c*. The first supplied portion 91*a* of the first oil passage 91 is formed by the opening on the second side L2 in the axial direction of the second oil flow tube 42.

As shown in FIG. 2, in the present embodiment, the second wall 32 includes a fourth connection portion 33*d* having a cylindrical shape extending in the axial direction L. The end of the first oil flow tube 41 on the second side L2 in the axial direction is fitted in the fourth connection portion 33*d* from the first side L1 in the axial direction, and an end (the opposite end from the end connected to the third connection portion 33*c*) of the third oil flow tube 43 is fitted in the fourth connection portion 33*d* from the second side L2 in the axial direction. The downstream-side end of the merged oil passage 83 is formed so as to open to the inner peripheral surface of the fourth connection portion 33*d*. The downstream-side end of the merged oil passage 83, the upstream-side end of the downstream-side oil passage 84, and the upstream-side end (the second supplied portion 94*a*) of the fourth oil passage 94 are thus connected in the fourth connection portion 33*d*. The first oil flow tube 41 is disposed such that its both ends are located at different positions in the axial direction L (e.g., is disposed so as to extend in the axial direction L), and the second supplied portion 94*a* of the fourth oil passage 94 is formed by the opening on the second side L2 in the axial direction of the first oil flow tube 41. The second discharge holes 94*b* are formed so as to extend through a cylindrical portion of the first oil flow tube 41.

OTHER EMBODIMENTS

Other embodiments of the structure for cooling a rotating electrical machine and the vehicle drive device will be described below.

(1) The configuration of the hydraulic circuit (see FIG. 5) described in the above embodiment is merely illustrative and may be modified as appropriate. For example, the above embodiment is described with respect to the configuration in which the fourth oil passage 94 is formed so as to branch from the supply oil passage 90. However, the fourth oil passage 94 may be connected to the second discharge oil passage 82 without the supply oil passage 90 interposed therebetween. That is, oil discharged from the first oil pump OP1 may be supplied only to the second rotating electrical machine MG2 out of the first and second rotating electrical machines MG1, MG2. In this case, the second discharge oil passage 82 may not be merged with the supply oil passage 90. The above embodiment is described with respect to the configuration in which the vehicle drive device 1 includes the second oil pump OP2 in addition to the first oil pump OP1. However, the vehicle drive device 1 may include only the first oil pump OP1 out of the first and second oil pumps OP1, OP2.

(2) The above embodiment is described with respect to the configuration in which the connection portion 90a, namely a part of the supply oil passage 90 which is connected to the first supplied portion 91a, is formed along the second wall 32. However, the present disclosure is not limited to this configuration. The connection portion 90a may not be formed along the second wall 32.

(3) The above embodiment is described with respect to the configuration in which the second rotating electrical machine MG2 is disposed so as to overlap the drive transmission mechanism 2 (specifically, the counter gear mechanism CG) as viewed in the axial direction L. However, the present disclosure is not limited to this configuration. For example, the second rotating electrical machine MG2 may be disposed at a different position from the counter gear mechanism CG as viewed in the axial direction L so as not to overlap the counter gear mechanism CG as viewed in the axial direction L. The above embodiment is described with respect to the configuration in which the drive transmission mechanism 2 is disposed on the second side L2 in the axial direction with respect to the second rotating electrical machine MG2. However, the present disclosure is not limited to this configuration. At least a part of the drive transmission mechanism 2 (e.g., the counter gear mechanism CG) may be disposed on the first side L1 in the axial direction with respect to the second rotating electrical machine MG2.

(4) The configuration of the vehicle drive device 1 described in the above embodiment is merely illustrative and may be modified as appropriate. For example, the vehicle drive device 1 may not include the counter gear mechanism CG, and the distribution output gear 64 and the output gear 60 of the second rotating electrical machine MG2 may mesh with the differential input gear 65. In this case, unlike the above embodiment, the drive transmission mechanism 2 does not include the counter gear mechanism CG. The vehicle drive device 1 may not include the output differential gear unit DF, and the vehicle drive device 1 may transmit the driving force of the driving force sources for the wheels W to a single output member 4 instead of the pair of right and left output members 4 (that is, may transmit the driving force of the driving force sources for the wheels W to a single wheel W instead of the pair of right and left wheels W). In this case, unlike the above embodiment, the drive transmission mechanism 2 does not include the output differential gear unit DF.

(5) The above embodiment is described with respect to the configuration in which the vehicle drive device 1 is a drive device for driving a vehicle having both the internal combustion engine EG and the rotating electrical machines as driving force sources for the wheels W. However, the present disclosure is not limited to this configuration. The vehicle drive device 1 may be a drive device for driving a vehicle that does not include the internal combustion engine EG as a driving force source for the wheels W. For example, the vehicle drive device 1 may be a drive device for driving an electric vehicle (electric car) having only one or more rotating electrical machines as a driving force source(s) for the wheels W.

(6) The above embodiment is described with respect to the configuration in which the vehicle drive device 1 includes the first rotating electrical machine MG1 and the second rotating electrical machine MG2, and the structure for cooling a rotating electrical machine which is included in the vehicle drive device 1 is a structure for cooling the first rotating electrical machine MG1 and the second rotating electrical machine MG2. However, the present disclosure is not limited to this configuration. The vehicle drive device 1 may include only the second rotating electrical machine MG2 out of the first and second rotating electrical machines MG1, MG2, and the structure for cooling a rotating electrical machine which is included in the vehicle drive device 1 may be a structure for cooling the second rotating electrical machine MG2.

(7) The above embodiment is described with respect to the configuration in which the structure for cooling a rotating electrical machine is provided in the vehicle drive device 1. However, the present disclosure is not limited to this configuration. The structure for cooling a rotating electrical machine according to the present disclosure may be provided in a device or equipment other than the vehicle drive device.

(8) The configuration disclosed in each of the above embodiments may be combined with any of the configurations disclosed in the other embodiments (including combinations of the embodiments described as "Other Embodiments") unless inconsistency arises. Regarding other configurations as well, the embodiments disclosed in the specification are merely illustrative in all respects. Accordingly, various alterations can be made as appropriate without departing from the spirit and scope of the present disclosure.

Summary of Embodiments

The summary of the structure for cooling a rotating electrical machine and the vehicle drive device described above will be provided.

A structure for cooling a rotating electrical machine (MG2) accommodated in a case (30) includes: an oil pump (OP1); a supply oil passage (90) connected to a discharge port (52a) of the oil pump (OP1); a first oil passage (91) that is an oil passage located above a stator (21) of the rotating electrical machine (MG2) in a vertical direction (V) and that has a supplied portion (91a), a discharge hole (91b), and a discharge portion (91c), the supplied portion (91a) being connected to the supply oil passage (90), the discharge hole (91b) being formed on a first side (L1) in an axial direction, which is one side in the axial direction (L) of the rotating electrical machine (MG2), with respect to the supplied portion (91a) and being configured to discharge oil toward the stator (21), and the discharge portion (91c) being formed on the first side (L1) in the axial direction with respect to the discharge hole (91b); a second oil passage (92) formed inside a rotor shaft (26) to which a rotor (24) of the rotating electrical machine (MG2) is fixed; and a third oil passage (93) connecting the discharge portion (91c) of the first oil passage (91) and the second oil passage (92). The third oil passage (93) is formed along a first wall (31) of the case (30), which is located on the first side (L1) in the axial direction with respect to the rotating electrical machine (MG2).

With the above configuration, oil in the first oil passage (91) can be discharged toward the stator (21) through the discharge hole (91b) to cool the stator (21). Moreover, oil can be made to flow through the second oil passage (92) formed inside the rotor shaft (26) to cool the rotor (24).

With the above configuration, the structure for cooling the rotating electrical machine (MG2) includes the third oil passage (93) connecting the discharge portion (91c) of the first oil passage (91) and the second oil passage (92). A part of oil supplied from the supply oil passage (90) to the first oil passage (91) can thus be supplied to the second oil passage (92) through the third oil passage (93) to appropriately cool the rotor (24). Since the oil passage for supplying oil to the second oil passage (92) and the oil passage for supplying oil to the first oil passage (91) thus have a common part, the oil passage configuration can be restrained from becoming complex.

As described above, according to the above configuration, the structure for cooling the rotating electrical machine (MG2) can be implemented which can appropriately cool not only the stator (21) but also the rotor (24).

An end of the rotor shaft (26) on a second side (L2) in the axial direction may be located on the second side (L2) in the axial direction with respect to a second wall (32) of the case (30) which is located on the second side (L2) in the axial direction with respect to the rotating electrical machine (MG2), the second side (L2) in the axial direction being an opposite side in the axial direction (L) from the first side (L1) in the axial direction.

In the above configuration, the end of the rotor shaft (26) on the second side (L2) in the axial direction is located on the second side (L2) in the axial direction with respect to the second wall (32). In this case, for example, even if an oil passage is formed inside the second wall (32), this oil passage cannot be directly connected to the end of the rotor shaft (26) on the second side (L2) in the axial direction. In order to supply oil from the end of the rotor shaft (26) on the second side (L2) in the axial direction to the second oil passage (92), a connection oil passage needs to be formed which connects the oil passage formed inside the second wall (32) and the end of the rotor shaft (26) on the second side (L2) in the axial direction. This tends to make the oil passage configuration complex and also tends to increase the overall size of the configuration as the connection oil passage needs to be located so as to bypass members (e.g., the drive transmission mechanism (2) etc.) disposed on the second side (L2) in the axial direction with respect to the second wall (32). On the other hand, in the structure for cooling the rotating electrical machine (MG2) according to the present disclosure, as described above, oil can be supplied from the supply oil passage (90) to the second oil passage (92) through the first oil passage (91) and the third oil passage (93). Accordingly, the oil passage configuration can be restrained from becoming complex and an increase in overall size of the configuration can be restrained even if the end of the rotor shaft (26) on the second side (L2) in the axial direction is located on the second side (L2) in the axial direction with respect to the second wall (32) as in the above configuration.

A connection portion (90a) of the supply oil passage (90) may be formed along a second wall (32) of the case (30) which is located on a second side (L2) in the axial direction with respect to the rotating electrical machine (MG2), the connection portion (90a) being a part of the supply oil passage (90) which is connected to the supplied portion (91a), and the second side (L2) in the axial direction being an opposite side in the axial direction (L) from the first side (L1) in the axial direction.

With the above configuration, as described above, not only the third oil passage (93) is formed along the first wall (31) but also the connection portion (90a) of the supply oil passage (90) is formed along the second wall (32). It is therefore easy to appropriately form these oil passages in the space where the walls of the case (30) are placed. An increase in overall size of the configuration can thus be restrained.

The supply oil passage (90) may be formed by using a tubular member (43).

In order to directly connect the supply oil passage (90) and the second oil passage (92), a branch portion from the supply oil passage (90) to the second oil passage (92) needs to be formed. This increases the number of connection portions between the supply oil passage (90) and other oil passages. Typically, the larger the number of connection portions between the supply oil passage (90) and other oil passages is, the higher the machining accuracy and mounting accuracy required for the supply oil passage (90) are. If dimensional tolerance and mounting tolerance of the supply oil passage (90) are increased in order to facilitate mounting of the supply oil passage (90), oil is more likely to leak through the connection portions. This problem tends to be significant when the supply oil passage (90) is formed by using a tubular member (43) as in the above configuration. However, in the structure for cooling the rotating electrical machine (MG2) according to the present disclosure, no branch portion from the supply oil passage (90) to the second oil passage (92) needs to be formed. Accordingly, this problem can be easily avoided.

A first rotating electrical machine (MG1) and a second rotating electrical machine (MG2) may be accommodated in the case (30), the second rotating electrical machine (MG2) being the rotating electrical machine (MG2), and the structure for cooling the rotating electrical machine (MG2) may further include: an oil cooler (OC) provided in the supply oil passage (90); and a cooling oil passage (94) through which oil for cooling the first rotating electrical machine (MG1) flows, the cooling oil passage (94) being an oil passage branching from a part of the supply oil passage (90) which is located downstream of the oil cooler (OC).

With the above configuration, oil can be supplied from the supply oil passage (90) not only to the first oil passage (91) but also to the cooling oil passage (94). Accordingly, the oil passage for cooling the first rotating electrical machine (MG1) and the oil passage for cooling the second rotating electrical machine (MG2) have a common part, whereby the oil passage configuration can be restrained from becoming complex. With the above configuration, the cooling oil passage (94) is formed so as to branch from the part of the supply oil passage (90) which is located downstream of the oil cooler (OC). Accordingly, oil cooled by the oil cooler (OC) can be supplied to both the first rotating electrical machine (MG1) and the second rotating electrical machine (MG2) to appropriately cool the first rotating electrical machine (MG1) and the second rotating electrical machine (MG2).

The oil pump (OP1) may be placed on a different axis from the rotating electrical machine (MG2).

In the structure for cooling the rotating electrical machine (MG2) according to the present disclosure, even if the oil pump (OP1) is placed on a different axis from the rotating electrical machine (MG2) (i.e., on a different axis from the second oil passage (92)) as in the above configuration, oil can be supplied from the supply oil passage (90) to the second oil passage (92) through the first oil passage (91) and the third oil passage (93) while restraining the oil passage configuration from becoming complex.

A vehicle drive device (1) includes: the structure for cooling the rotating electrical machine (MG2); an output member (4) drivingly coupled to a wheel (W); and a drive transmission mechanism (2) that transmits a driving force of the rotating electrical machine (MG2) to the output member (4), and the oil pump (4) is driven by rotation of the drive transmission mechanism (2).

With the above configuration, regardless of the drive mode of the vehicle having the vehicle drive device (1) mounted thereon, the oil pump (OP1) can be constantly driven while the vehicle is moving. Accordingly, regardless of the drive mode, oil can be supplied to the first oil passage (91) and the second oil passage (92) to cool the stator (21) and the rotor (24) of the rotating electrical machine (MG2).

The rotating electrical machine (MG2) may be disposed so as to overlap the drive transmission mechanism (2) as viewed in the axial direction (L).

In the case where the rotating electrical machine (MG2) is disposed so as to overlap the drive transmission mechanism (2) as viewed in the axial direction (L), the vehicle drive device (1) tends to be increased in size in the axial direction (L) in the portion where the rotating electrical machine (MG2) is disposed. In this respect, in the technique according to the present disclosure, the third oil passage (93) is formed along the first wall (31), whereby the vehicle drive device (1) can be restrained from being increased in size in the axial direction (L) in the portion where the rotating electrical machine (MG2) is disposed. It is therefore easy to apply the technique according to the present disclosure in the case where the rotating electrical machine (MG2) is disposed so as to overlap the drive transmission mechanism (2) as viewed in the axial direction (L).

In the configuration in which the rotating electrical machine (MG2) is disposed so as to overlap the drive transmission mechanism (2) as viewed in the axial direction (L) as described above, the drive transmission mechanism (2) may be disposed on an opposite side in the axial direction (L) of the rotating electrical machine (MG2) from the first side (L1) in the axial direction.

With the above configuration, the drive transmission device (2) can be disposed at a position that less affects the configuration of the third oil passage (93). This makes it easier to form the third oil passage (93) along the first wall (31).

The structure for cooling a rotating electrical machine and the vehicle drive device according to the present disclosure need only have at least one of the effects described above.

What is claimed is:

1. A structure for cooling a rotating electrical machine accommodated in a case, comprising:
    an oil pump;
    a supply oil passage connected to a discharge port of the oil pump;
    a first oil passage that is an oil passage located above a stator of the rotating electrical machine in a vertical direction and that has a supplied portion, a discharge hole, and a discharge portion, the supplied portion being connected to the supply oil passage, the discharge hole being formed on a first side in an axial direction, which is one side in the axial direction of the rotating electrical machine with respect to the supplied portion and being configured to discharge oil toward the stator, the discharge portion being formed on the first side with respect to the discharge hole;
    a second oil passage formed inside a rotor shaft to which a rotor of the rotating electrical machine is fixed; and
    a third oil passage connecting the discharge portion of the first oil passage and the second oil passage, the third oil passage being formed along a first wall of the case, which is located on the first side in the axial direction with respect to the rotating electrical machine.

2. The structure according to claim 1, wherein:
    an end of the rotor shaft on a second side in the axial direction is located on the second side in the axial direction with respect to a second wall of the case, which is located on the second side with respect to the rotating electrical machine, the second side being an opposite side in the axial direction from the first side.

3. The structure according to claim 2, wherein a connection portion of the supply oil passage is formed along the second wall of the case, the connection portion being a part of the supply oil passage which is connected to the supplied portion.

4. The structure according to claim 3, wherein the supply oil passage is formed by using a tubular member.

5. The structure according to claim 4, wherein:
    a first rotating electrical machine and a second rotating electrical machine are accommodated in the case, the second rotating electrical machine being the rotating electrical machine; and
    the structure further comprises:
        an oil cooler provided in the supply oil passage; and
        a cooling oil passage through which oil for cooling the first rotating electrical machine flows, the cooling oil passage being an oil passage branching from a part of the supply oil passage, which is located downstream of the oil cooler.

6. The structure according to claim 5, wherein the oil pump is placed on a different axis from the rotating electrical machine.

7. The structure according to claim 2, wherein the supply oil passage is formed by using a tubular member.

8. The structure according to claim 2, wherein:
    a first rotating electrical machine and a second rotating electrical machine are accommodated in the case, the second rotating electrical machine being the rotating electrical machine; and
    the structure further comprises:
        an oil cooler provided in the supply oil passage; and
        a cooling oil passage through which oil for cooling the first rotating electrical machine flows, the cooling oil passage being an oil passage branching from a part of the supply oil passage, which is located downstream of the oil cooler.

9. The structure according to claim 1, wherein a connection portion of the supply oil passage is formed along a second wall of the case, which is located on a second side in the axial direction with respect to the rotating electrical machine, the connection portion being a part of the supply oil passage which is connected to the supplied portion, and the second side being an opposite side in the axial direction from the first side.

10. The structure according to claim 9, wherein the supply oil passage is formed by using a tubular member.

11. The structure according to claim 9, wherein:
a first rotating electrical machine and a second rotating electrical machine are accommodated in the case, the second rotating electrical machine being the rotating electrical machine; and
the structure further comprises:
   an oil cooler provided in the supply oil passage; and
   a cooling oil passage through which oil for cooling the first rotating electrical machine flows, the cooling oil passage being an oil passage branching from a part of the supply oil passage, which is located downstream of the oil cooler.

12. The structure according to claim 1, wherein the supply oil passage is formed by using a tubular member.

13. The structure according to claim 12, wherein:
a first rotating electrical machine and a second rotating electrical machine are accommodated in the case, the second rotating electrical machine being the rotating electrical machine; and
the structure further comprises:
   an oil cooler provided in the supply oil passage; and
   a cooling oil passage through which oil for cooling the first rotating electrical machine flows, the cooling oil passage being an oil passage branching from a part of the supply oil passage, which is located downstream of the oil cooler.

14. The structure according to claim 1, wherein:
a first rotating electrical machine and a second rotating electrical machine are accommodated in the case, the second rotating electrical machine being the rotating electrical machine; and
the structure further comprises:
   an oil cooler provided in the supply oil passage; and
   a cooling oil passage through which oil for cooling the first rotating electrical machine flows, the cooling oil passage being an oil passage branching from a part of the supply oil passage, which is located downstream of the oil cooler.

15. The structure according to claim 1, wherein the oil pump is placed on a different axis from the rotating electrical machine.

16. A vehicle drive device, comprising:
the structure according to claim 1;
an output member drivingly coupled to a wheel; and
a drive transmission mechanism that transmits a driving force of the rotating electrical machine to the output member;
wherein the oil pump is driven by rotation of the drive transmission mechanism.

17. The vehicle drive device according to claim 16, wherein
the rotating electrical machine is disposed so as to overlap the drive transmission mechanism as viewed in the axial direction.

18. The vehicle drive device according to claim 17, wherein
the drive transmission mechanism is disposed on an opposite side in the axial direction of the rotating electrical machine from the first side.

* * * * *